United States Patent
Fu et al.

(10) Patent No.: US 7,489,097 B2
(45) Date of Patent: Feb. 10, 2009

(54) SENSORLESS POSITION DETECTION FOR A BRUSHLESS DIRECT CURRENT MOTOR DURING INVERTER STANDBY

(75) Inventors: Zhenxing Fu, Ann Arbor, MI (US); Lars Weinschenker, Royal Oak, MI (US); JingChuan Li, Troy, MI (US)

(73) Assignees: Chrysler LLC, Auburn Hills, MI (US); Daimler AG, Stuttgart (DE); GM Global Technology Operations, Inc., Detroit, MI (US); Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/555,864

(22) Filed: Nov. 2, 2006

(65) Prior Publication Data

US 2008/0106224 A1 May 8, 2008

(51) Int. Cl.
*H02P 6/00* (2006.01)
(52) U.S. Cl. .................. 318/400.01; 318/400.34; 318/459
(58) Field of Classification Search .......... 318/138, 318/439, 254, 599, 811, 500, 459, 400.01, 318/400.34, 432
See application file for complete search history.

(56) References Cited

U.S. PATENT DOCUMENTS

| | | | | |
|---|---|---|---|---|
| 4,551,708 A | * | 11/1985 | Welburn | 341/116 |
| 5,541,484 A | * | 7/1996 | DiTucci | 318/254 |
| 5,862,301 A | * | 1/1999 | Gontowski, Jr. | 388/800 |
| 6,034,493 A | * | 3/2000 | Boyd et al. | 318/400.31 |
| 6,169,378 B1 | * | 1/2001 | Karwath | 318/254 |
| 6,720,674 B1 | | 4/2004 | Gabrys | |
| 6,879,129 B2 | | 4/2005 | Tazawa et al. | |

FOREIGN PATENT DOCUMENTS

| | | |
|---|---|---|
| EP | 0 661 800 A | 7/1995 |
| JP | 07 284290 A | 10/1995 |
| JP | 2003 219683 A | 7/2003 |

* cited by examiner

*Primary Examiner*—Rina I Duda
(74) *Attorney, Agent, or Firm*—Ralph E. Smith

(57) ABSTRACT

A method of controlling a brushless direct current motor without a position sensor. The motor includes a plurality phase windings adapted to be energized by an active inverter circuit that synchronously applies drive voltages through a plurality of phases to produce drive currents in the phase windings. Back electromotive force voltages are detected when the inverter circuit is inactive for sensorless detection of motor position.

10 Claims, 3 Drawing Sheets

SENSORLESS POSITION DETECTION FOR A BRUSHLESS DIRECT CURRENT MOTOR DURING INVERTER STANDBY

FIELD OF THE INVENTION

The present invention relates generally to electric motors, and more particularly to vehicle transmissions including electric motor driven pumps.

BACKGROUND OF THE INVENTION

Vehicle transmissions typically include one or more pumps to deliver pressurized hydraulic fluid for lubrication and actuation of transmission shift elements. These transmission pumps are typically driven by torque from an engine coupled to the transmission. In some of these transmissions, the pumps are required to operate to maintain oil pressure in the transmission even when the engine is idled or stopped, such as in electric drive mode in a hybrid electric vehicle. One such transmission may include a main pump and an auxiliary pump, which adds weight, cost, and complexity. Another such transmission may include two or more overrunning clutches to carry torque from the engine and an auxiliary electric motor to a single transmission pump. The latter transmission uses multiple overrunning clutches, and undesirable electric motor equipment and control techniques.

Auxiliary pumps are typically driven by a brushless direct current (BLDC) motor, which generally includes a controller, power electronics inverter, a stator with three phase windings, and a rotor with permanent magnets responsive to electricity flowing through the windings. The controller and power electronics inverter together control the motor by sequentially energizing the windings with electrical current to produce a rotating magnetic field in the motor. The magnetic field attracts the rotor magnets, which thus follow the rotation of the field and, therefore, cause the rotor to rotate. But proper motor phase winding commutation depends on rotational position of rotor magnets at any given time relative to the phase winding to be energized next.

Rotor position information for proper commutation of motor phase windings can be acquired by using a position sensor or encoder. However, such devices increase cost and reduce reliability of the motor and, thus, it has become increasingly desirable to control a brushless DC motor without using such devices. One typical sensorless control approach is to use back electromagnetic frequency (EMF) zero-crossing detections in an idle phase winding to estimate rotor position. This is possible because only two of the three motor phase windings are energized at any given time, and a third phase winding is idle and available for back EMF detection.

But prior technology for sensorless control of BLDC motors does not enable detection of back EMF zero-crossings while an inverter circuit is inactive. This is because when an inverter circuit is inactive, the power electronics switches are open and voltages in the phases are floating and isolated from ground reference. Also, it is impossible in this condition to reliably sense useful voltage signals and determine back EMF zero-crossings for estimating motor positions and, thus, motor speeds. Accordingly, commutation of present sensorless BLDC motors requires expensive sensors, costly low voltage control connections to the electric motor with hermetic seals, and/or complex motor position sensing techniques.

SUMMARY OF THE INVENTION

A method of controlling a brushless direct current motor without a position sensor, wherein the motor includes a plurality of phase windings adapted to be energized by an active inverter circuit. The active inverter circuit synchronously applies drive voltages through a plurality of phases to produce drive currents in the phase windings. The plurality of phases are ground referenced through a plurality of resistors, and back electromotive force voltages are detected when the inverter circuit is inactive for sensorless detection of motor position.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1:
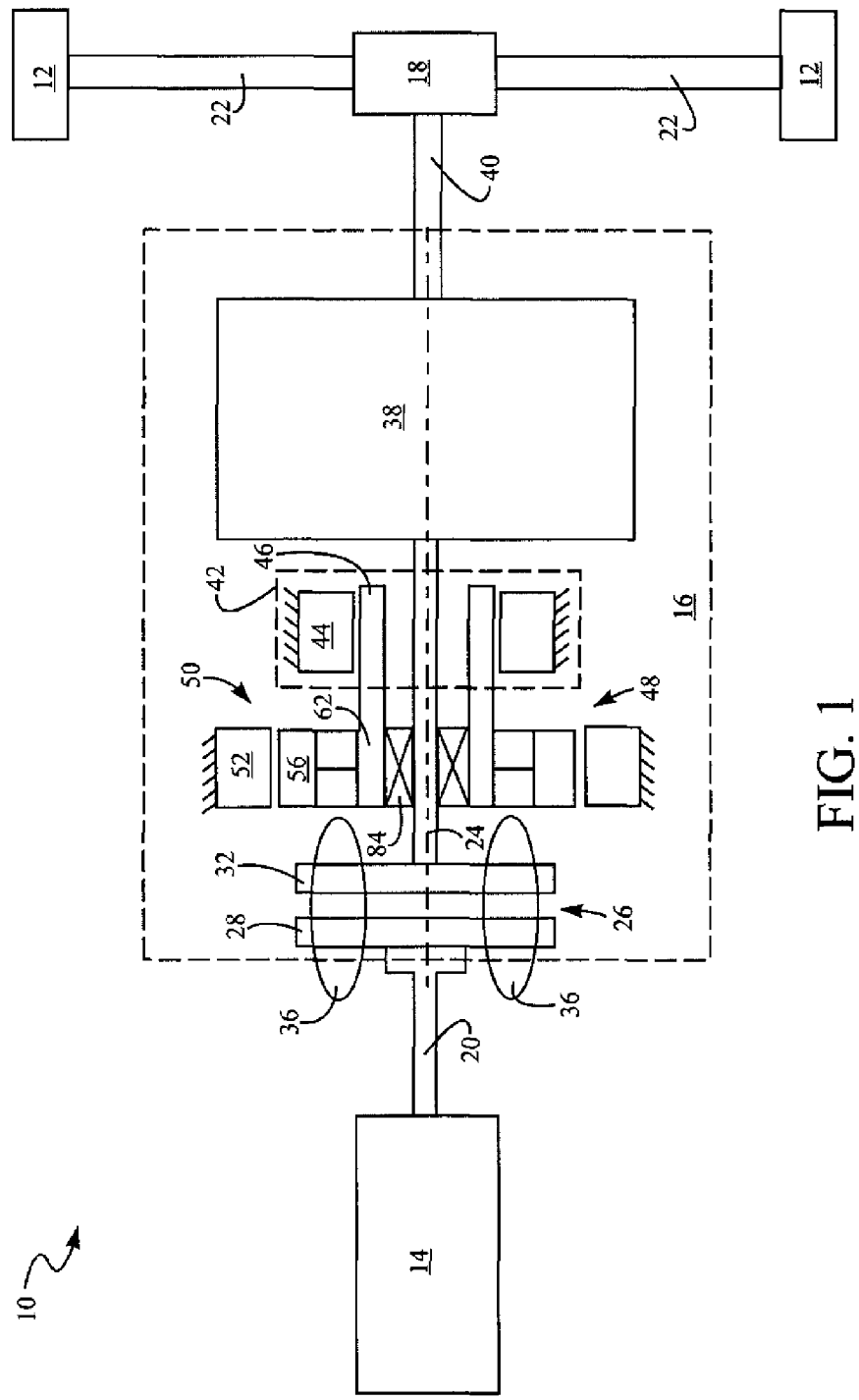
FIG. 1 is a block diagram of an embodiment of a vehicle powertrain.

Referring in more detail to the drawings, FIG. 1 illustrates an exemplary vehicle drivetrain 10 that delivers torque to vehicle wheels 12 for driving a vehicle. The drivetrain 10 includes an exemplary prime mover 14 to provide prime mover torque for the drivetrain, and an exemplary transmission 16 to receive the prime mover torque and convert it to, and transmit it as, transmission output torque. The drivetrain 10 can also include an exemplary differential 18 to receive the transmission output torque, and convert it and redirect it to the wheels 12. The prime mover 14 can be an internal combustion engine, electric motor, or any other suitable device to generate torque. The prime mover 14 includes an output shaft 20 such as a crankshaft, rotor shaft, or the like. Similarly, the differential 18 can include output shafts 22 and can be a rear-wheel-drive rear axle, a front-wheel-drive final drive unit, or any other suitable device to convert, transmit, redirect, or otherwise carry torque. Those skilled in the art will recognize that any other suitable drivetrain configuration can also or instead be used with the novel aspects of the transmission structure described below.

Figure 2:
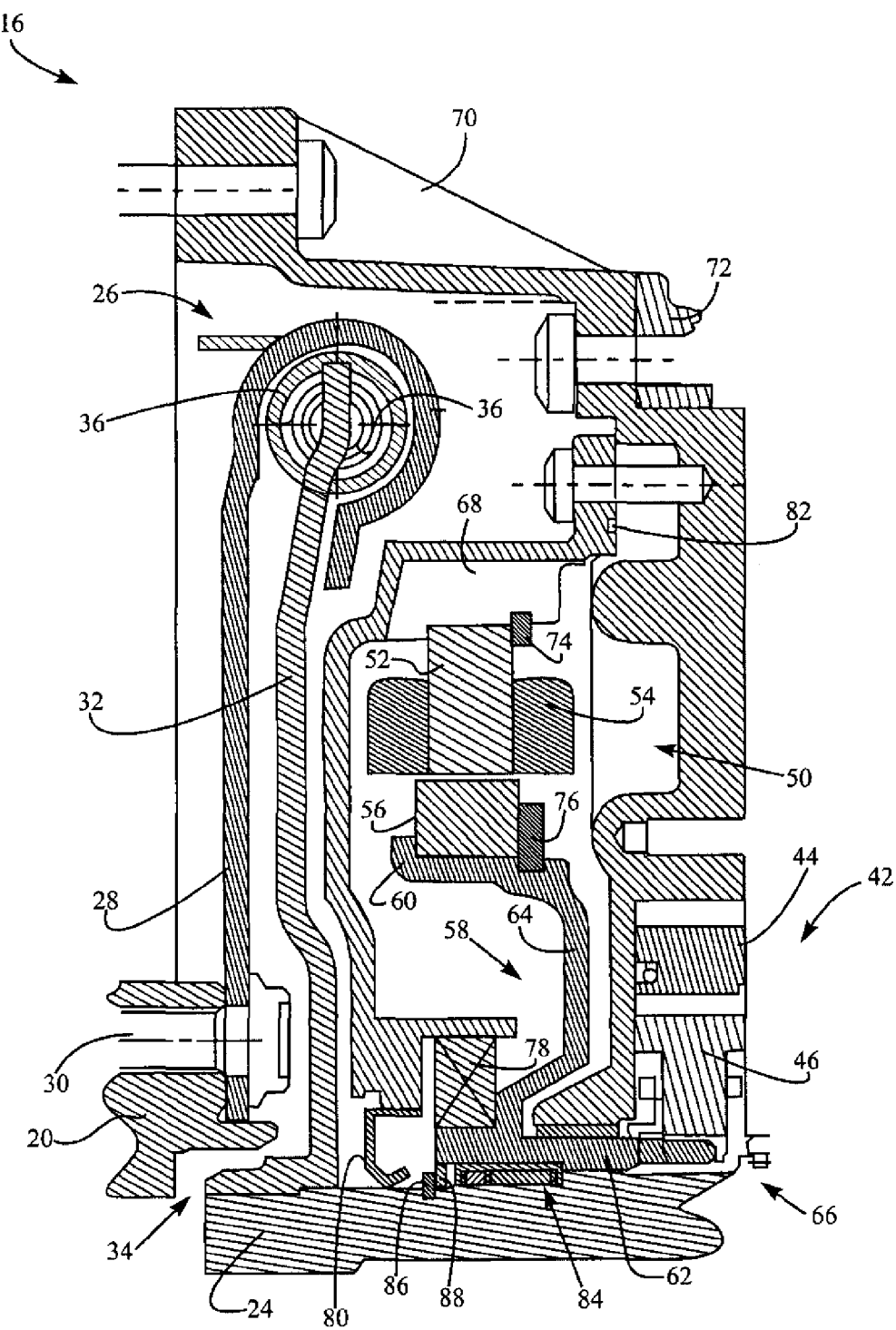
FIG. 2 is a cross-sectional view of an embodiment of a transmission pump drive of the vehicle powertrain of FIG. 1.

Referring now to FIGS. 1 and 2, the transmission 16 can be any suitable type of vehicle transmission such as a discrete-speed automatic transmission, a continuously variable automatic transmission, or any other suitable transmission of any kind. The transmission 16 includes an input shaft 24 and can include a coupling 26 to couple the input shaft 24 to the output shaft 20 of the prime mover 14. The coupling 26 can be any suitable type of wet or dry coupling such as a torque converter, or an exemplary torsional-vibration damper as shown. For example, the coupling 26 can be a dry damper and can include an input element 28 connected to the prime mover output shaft 20 in any suitable manner such as by bolts 30. The coupling 36 can also include an output element 32 connected to the transmission input shaft 24 in any suitable manner, such as by a splined connection 34. The coupling 26 can further include dampening elements 36, such as springs, interposed between the input element 26 and output element 32 to provide a dampened connection.

The transmission 16 can also include a torque conversion portion 38 such as motors, gearsets, pulleys and sheaves, or other speed reducers, or any combination thereof. The torque conversion portion 38 can provide mechanical advantage by reducing speed and increasing torque between the transmission input shaft 24 and an output shaft 40 of the transmission 16.

The transmission 16 also includes an exemplary pump 42 to deliver pressurized hydraulic fluid to other portions of the transmission 16 such as the torque conversion portion 38 for lubrication and/or actuation of transmission elements like clutches and pistons therein (not shown). The pump 42 can include a fixed element such as a stator 44 and an input element such as a rotor 46 positioned within the stator 44. The pump 42 can be any suitable fluid pumping device such as a gerotor pump, vane pump, turbine pump, or any other pump of any kind.

The transmission 16 further includes a pump drive 48 to drive the pump 42, whether the prime mover 14 is operating or not. The pump drive 48 includes a transmission input torque member, such as the transmission input shaft 24, which carries prime mover torque. The transmission input torque member can be a solid shaft as shown or a hollow shaft or tube, a hub, or any other suitable torque carrying element. The pump drive 48 also includes a source of pump input torque, such as a motor 50.

The motor 50 can be any suitable device to create torque, such as an electric motor. For example, the electric motor 50 can include a stator 52, windings 54, and a rotor 56 coupled to a torque transmitting member 58 to apply torque directly to the transmission pump 42. The torque transmitting member 58 can be any suitable component(s) to carry torque from the electric motor 50 to the pump 42. The torque transmitting member 58 can include an outer ring 60 coupled to an inner hub or pump input torque member 62 by a spoke or web 64, which can be integrally formed with the ring 60 and pump input torque member 62.

The pump input torque member 62 can be any suitable component for carrying torque, such as the hollow shaft as shown in FIG. 2. The pump input torque member 62 is coaxial with and circumscribes the transmission input shaft 24 and can be coaxially coupled to the inner pump element or rotor 46 in any suitable manner such as using a splined connection 66 as shown in FIG. 2. But the pump rotor 46 and pump input torque member 62 can instead be coupled in any other suitable fashion including being integrated together as a unitary component. Moreover, the motor rotor 56 and pump input torque member 62 can be similarly coupled in any suitable fashion including being integrated together as a unitary component.

Referring to FIG. 2, the pump drive 48 can be housed within a pump drive housing 68 to provide support for, and enclose, the pump drive 48. The pump drive housing 68 can be carried by a transmission bell housing 68 that is carried by a transmission case 70. The stator 52 can be carried by the pump drive housing 68 in any suitable manner, such as using a snap ring 74 and/or a press fit or splined connection. The motor rotor 56 is rotatable with respect to the stator 52 and is carried by the torque transmitting member 58 in any suitable fashion, such as by a snap ring 76 and/or a press fit or splined connection. Any suitable bearing 78 can be interposed between the pump input torque member 62 and a portion of the housing 66 to provide support for the housing 66. Also, any suitable seal 80 can be interposed between the transmission input shaft 24 and another portion of the housing 66, and another suitable seal 82 of any kind can be interposed between a flange of the pump drive housing 68 and a portion of the bell housing 70 to provide a sealed environment for the pump drive 48. The seals 80, 82 enable the pump drive 48 to operate in a sealed environment and enables use of the dry damper 26 as opposed to a wet damper.

The pump drive 48 further includes an overrunning clutch 84 disposed between the pump input torque member 62 and the transmission input shaft 24 to carry torque from the transmission input shaft 24 to the pump input torque member 62. The overrunning clutch 84 is also known as a freewheel or one-way clutch and, generally, is a machine element for connection and disconnection of other elements in a transmission. Overrunning clutches are well known to those skilled in the art and any suitable type of overrunning clutch can be used such as a sprag, spring, roller, ball, pawl-and-ratchet clutch, and/or the like. The overrunning clutch 84 can be carried by the pump input torque member 62 and/or the input shaft 24 and can be axially trapped along the input shaft 24 by a snap ring 86 with a thrust washer 88 disposed therebetween.

As used with the pump drive 48, the overrunning clutch 84 enables the input shaft 24 to be disengaged from the pump input torque member 62 when the pump input torque member 62 rotates faster than the input shaft 24, such as when the prime mover 14 is not rotating or is idling relatively slowly. In other words, the overrunning clutch 84 has two functions: 1) it engages to lock the transmission input shaft 24 and the pump input torque member 62 together when the prime mover 14 is operating above a threshold speed to provide indirect driving to the pump 42; and 2) it releases to permit the pump input torque member 62 to provide direct driving to the pump 42 by overrunning the transmission input shaft 24 when the prime mover 14 is not rotating or is rotating below the threshold speed, i.e. more slowly than the threshold speed of the pump input torque member 62.

Accordingly, the pump 42 can be driven directly by the pump's electric motor 50 through the pump input torque member 62, and/or indirectly by the prime mover 14 through the overrunning clutch 84, depending on which source of torque is rotating faster at any given time. For example, at any prime mover speed that is less than sufficient to maintain the threshold pump speed, the electric motor 50 can be activated to rotate the pump 42 at the threshold speed or greater until the prime mover speed increases to a level sufficient to maintain or exceed the threshold speed again. At that point, the electric motor 50 can be deactivated, such as to a standby mode, until the prime mover or pump speed again falls below the threshold speed, which can be any suitable value such as about 2,200 RPM. The motor 50 can be placed in standby mode to avoid conflicts wherein the motor 50 and prime mover 14 simultaneously attempt to regulate the speed of the pump 42.

Figure 3:
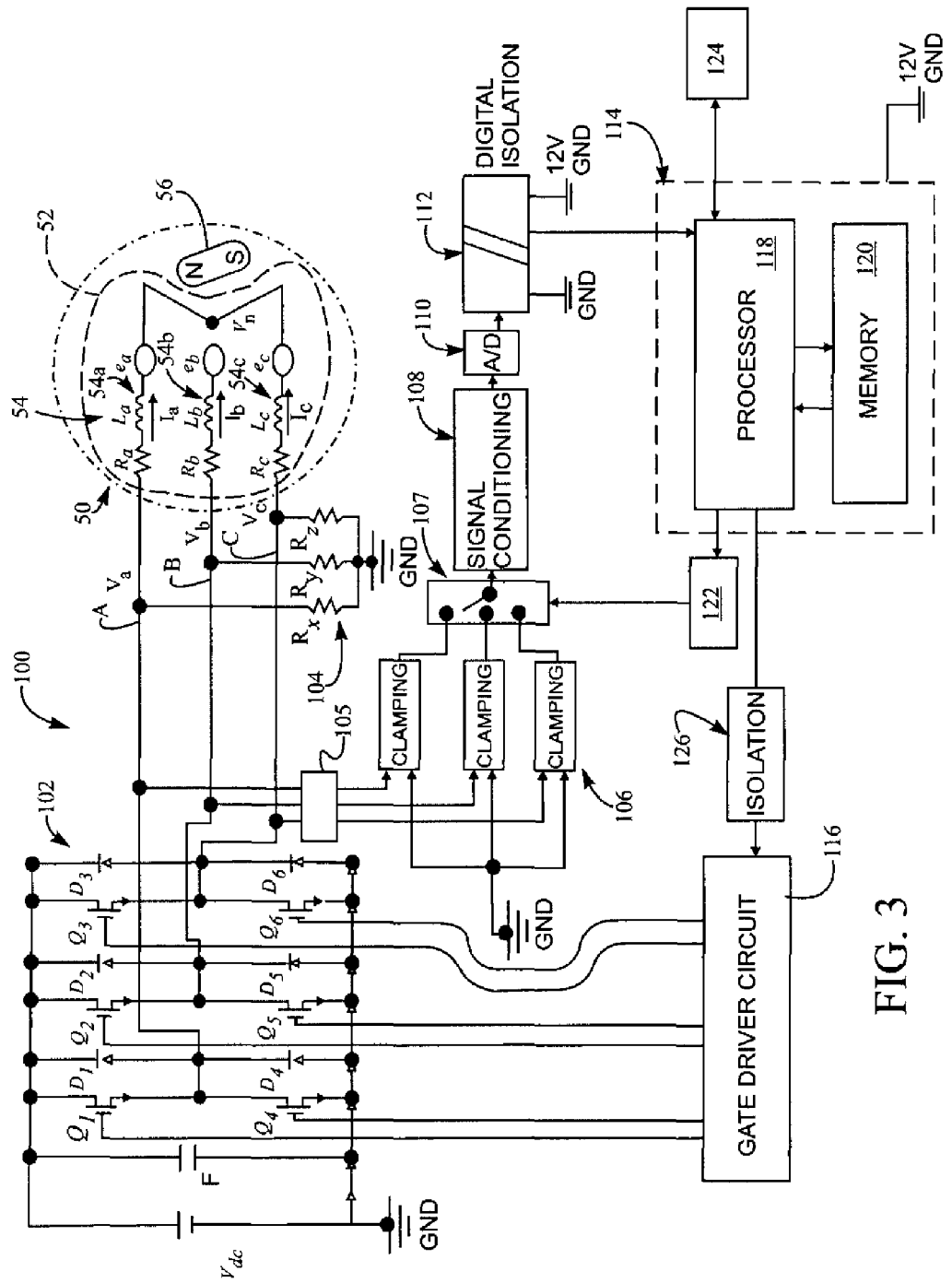
FIG. 3 is a schematic diagram of an embodiment of a brushless direct current motor arrangement for use with the transmission pump of FIG. 2.

Referring now to FIG. 3, the electric motor 50 and its drive system 100 are shown schematically. The electric motor 50 is a sensorless brushless direct current (SBLDC) motor that does not require position or speed sensors. Such sensors can be used but are not desired because the drive system 100 for the electric motor 50 can be used to sense motor terminal voltages and determine the speed and position of the rotor 56 based on the sensed motor back EMF voltages, even when the motor 50 is inactive or in a standby mode. The motor 50 may be in standby mode at any time, such as when prime mover speed is above the threshold speed for maintaining suitable transmission pump output.

The motor 50 is shown with its stator 52, windings 54 including three phase windings 54a, 54b, 54c wound on the stator 52, and rotor 56 having magnetic poles N, S in rotational proximity to the windings 54. Each of the phase windings 54a, 54b, 54c is connected to an exemplary inverter circuit 102 that powers the motor 50. A filter capacitor C can be placed in parallel with the inverter circuit 102, and electricity is supplied to the inverter circuit 102 from a DC voltage source $V_{dc}$, such as one or more DC batteries, fuel cell(s), generator(s), power converter(s), and/or the like.

In the exemplary inverter circuit 102, there are two or more commutating switches corresponding to each phase winding 54a, 54b, 54c for commutating the phase windings 54a, 54b, 54c of the motor 50. Each set of switches is disposed in series across high and low sides of the inverter circuit 102. The first phase A and phase winding 54a, are connected between a first high side switch Q1 and a first low side switch Q4, the second phase B and phase winding 54b are connected between a second high side switch Q2 and a second low side switch Q5, and the third phase C and phase winding 54c are connected between a third high side switch Q3 and a third low side switch Q6. The switches Q1-Q6 can be any suitable switching devices, such as IGBTs, MOSFETs, or any other suitable semiconductor or transistor devices. Also in the inverter circuit 102, respective freewheeling diodes D1, D4, D2, D5, D3, D6 are connected in reverse parallel with the switches Q1, Q4, Q2, Q5, Q3, Q6. Those skilled in the art will recognize that the switches Q1-Q6 can include integrated freewheeling diodes, instead of having the freewheeling diodes D1-D6 provided separately.

In an inverter active mode, the inverter circuit 102 selectively applies phase voltages $V_a$, $V_b$, $V_c$ to one or more of the windings 54a, 54b, 54c, thereby causing phase currents $I_a$, $I_b$, $I_c$ to flow through the windings 54a, 54b, 54c, to energize the windings 54a, 54b, 54c. The windings 54a, 54b, 54c include inductance components $L_a$, $L_b$, $L_c$ and resistance components $R_a$, $R_b$, $R_c$.

Even when the inverter circuit 102 is in an inverter inactive mode, rotation of the rotor 56 produces back electromagnetic force (EMF) voltages $e_a$, $e_b$, $e_c$ in the phase windings 54a, 54b, 54c. To facilitate sensing of the back EMF voltages $e_a$, $e_b$, $e_c$ in the windings 54a, 54b, 54c during the inverter inactive mode, a bank of resistors 104 is placed between the inverter circuit 102 and the motor 50 between three phases A, B, C and ground. The bank of resistors 104 includes at least one first resistor $R_x$ connected to the first phase, at least one second resistor $R_y$ connected to the second phase, and at least one third resistor $R_z$ connected to the third phase. The values of the resistors $R_x$, $R_y$, $R_z$ can be the same, and can be selected to yield good signal-to-noise ratios and voltage matching between measured circuits and control circuits. Those skilled in the art will recognize that the resistor values can be chosen on a case-by-case basis depending on the motor specifications and the like.

High voltage control circuitry is connected to the phases A, B, C between the bank of resistors 104 and the inverter circuit 102. First, voltage scaling circuitry 105 can be placed in communication with the phases A, B, C just downstream of the inverter circuit 102. Second, a bank of clamping circuits 106 can be placed between the phases A, B, C and ground. Third, a selector 107 is placed downstream of the clamping circuits 106 to select from among the three phases A, B, C depending on the switching state of the inverter circuit 102. Fourth, any suitable signal conditioning module 108 can be placed downstream of the selector 107. Fifth, an analog-to-digital (A/D) converter 110 can be placed downstream of the signal conditioning module 108 to convert analog values of phase voltages of selected phases into digital values. Finally, any suitable digital isolation 112, such as opto-couplers or the like, can be placed downstream of the A/D converter 110 for suitable coupling to a lower voltage controller 114.

The controller 114 can include commutating logic and/or circuits, which produce output signals for triggering the power electronics switches Q1-Q6 depending on the determined instantaneous rotor position of the motor 50 to thereby commutate the phase windings 54a, 54b, 54c of the motor 50. More specifically, the controller 114 can include any suitable device, circuits, software, and/or the like for receiving detected phase voltages, determining change rate and commutation time of the phase voltages, further processing such information, and outputting selection signals to the selector 107 and gate driver signals to a gate driver 116. The gate driver 116 can be circuitry that receives output Pulse Width Modulation (PWM) signals from the controller 114 and controls the turn-on and turn-off of the power switches Q1-Q6 in the inverter circuit 102 so as to commutate the motor 50, The controller 114 can include any suitable processor(s) 118 configured to execute control logic that provides at least some of the functionality for the phase switching In this respect, the processor 118 may encompass one or more processing units, microprocessors, micro-controllers, discrete logic circuit(s) having logic gates for implementing logic functions upon data signals, application specific integrated circuits (ASIC) with suitable logic gates, complex programmable logic devices (CPLD), programmable or field-programmable gate arrays (PGA/FPGA), any combinations of the aforementioned, and the like. The processor(s) 118 may be interfaced with any suitable memory 120, which can include any medium configured to provide at least temporary storage of data and/or software or instructions that provide at least some of the functionality of the switching and that may be executed by the processor 118. The controller 114 may also include any other suitable devices or modules, such as ancillary devices like clocks, power supplies, and the like.

Moreover, any other suitable devices can be placed in communication with the controller 114, such as one or more sensor(s), other controllers, or the like. In one example, the controller 114 can be coupled to any suitable output coupling module 122 to suitably couple the lower voltage processor 118 to the higher voltage selector 107. The coupling module 122 can include any suitable devices such as digital isolation, digital-to-analog converters, and/or the like. In another example, an input device 124 such as a prime mover speed sensor or a transmission input shaft speed sensor can be used by the controller 114, such as to determine when the rotational speed of the prime mover 14 and/or pump 42 falls below or raises above the threshold speed. In another example, the input device(s) 124 can include a prime mover controller, transmission controller, or any other vehicle controller of any kind. In a further example, the devices 124 can include transmission pressure sensors, throttle position sensors, and/or the like.

When the inverter 102 is active or in an inverter active mode, at any given moment two motor phases are conducting and a third phase is idle. In one example, when phase A and phase B are conducting, such as by turning on the power switches Q1 and Q5, phase C is the next phase to be energized, such as by turning on power switch Q6. The time instant for turning on power switch Q6 is determined based on the back EMF zero-crossing point of phase C. The back EMF in phase C is readily extracted using the voltage equations given in Eqs. 1 or 2 depending on the instant when the terminal voltage is sampled.

Referring to the exemplary circuitry in FIG. 3, and neglecting phase winding imbalance and the voltage drops across the power switches Q1 and Q5, the phase C terminal voltage is:

$$V_c = \frac{3}{2}e_c + \frac{V_{dc}}{2} \quad \text{Eq. 1}$$

when both Q1 and Q5 are "on", and $$V_c = \frac{3}{2}e_c \quad \text{Eq. 2}$$

when Q1 is "off" and Q5 is "on", or D4 is freewheeling.

Hence, the phase C back EMF signal $e_c$ can be extracted by sensing phase C terminal voltages and/or $V_{dc}/2$, also known as virtual neutral point voltage of a Y-connected electric motor, depending on the time instant for terminal voltage sampling. The phase terminal voltages are suitably scaled down and clamped for processing in the signal electronics TTL level. For example, the voltage scaling circuit 105 and clamping circuit(s) 106 may be used.

A suitable phase terminal voltage is selected, such as by the selector 107, and communicated to the controller 114 for back EMF zero-crossing decoding, which can be carried out by any suitable zero-cross decoding logic. Zero-cross decoding logic is generally known to those of skill in the art to determine which phase terminal voltage is to be monitored based on which PWM duty cycle commands are being sent to the gate driver 116 by the processor 118. For instance, when phase A and phase B are conducting at a given time, phase C terminal voltage is selected to be monitored.

Suitable signal conditioning is performed by the signal conditioning circuit 108 for filtering out electrical noise in the suitably selected phase terminal voltage signal. The A/D converter 110 converts the selected phase terminal voltage signal from analog form to digital form to the digital isolation 112 which in turn isolates the motor terminal voltage signal referenced to the high voltage ground to low voltage ground.

The controller 114 receives the selected phase terminal voltage signal and determines the time instant for back EMF zero crossing event. The controller 114 further uses the detected back EMF zero crossing event to estimate the operating position and/or speed of the motor 50 and determine when to turn on the corresponding phase in the form of PWM duty cycles, such that the energizing of motor phases are synchronized with the magnetic field created by the magnets on the rotating rotor for useful electromagnetic torque production. The electromagnetic torque required is determined by any suitable speed regulator in controller 114 in order to achieve a commanded speed setpoint that motor 50 has to operate at. Speed regulators are known to those skilled in the art and can include circuitry, software modules, and/or the like.

The controller 114 sends the PWM duty cycle commands to the gate driver 116 on the high voltage side via voltage isolation 126. The gate driver 116 amplifies the received PWM duty cycle commands and sends them to the appropriate gate pins of the corresponding power switches in the inverter 102 to energize the corresponding motor phases.

Back EMF zero crossings can also be detected when the inverter is inactive, preferably using the bank of resistors 104 for referencing the phase terminal voltages to ground, and any suitable motor phase terminal voltage sensing and conditioning circuitry. For example, any suitable voltage scaling, clamping, and signal conditioning circuitry and/or devices may be used, such as that shown in FIG. 3. In other words, the controller 114 can determine motor rotor position and/or speed using zero-crossings of the back EMF voltages $e_a$, $e_b$, $e_c$ even when the inverter circuit 102 is inactive, such as when the motor 50 is in a standby mode but the rotor 56 is still rotating For example, because the rotor 56 is coupled to the rotating pump input torque member 62, the rotor 56 rotates and back EMF signals are thus produced. The bank of resistors 104 suitably grounds the phases A, B, C when the inverter circuit 102 is inactive such that useful back EMF signals and/or phase terminal voltage signals with proper reference to high voltage ground from the phases can be sensed. Accordingly, useful back EMF zero-crossings can be determined in similar fashion as described above and, thus, motor positions and speeds can be determined even when the inverter is inactive.

The controller 114 determines when to operate the motor 50 so as to operate the pump 42 in an electric motor active mode. For example, the controller 114 can activate the motor 50 when the prime mover is not operating or is not rotating fast enough to properly power the pump 42. Also, the controller 114 can activate the motor 50 when transmission torque demand is below a certain threshold, and transmission clutch pressure and transmission cooling demand are below respective thresholds. Otherwise, when prime mover speed is sufficient to suitably operate the pump 42 at or above the pump threshold speed, then the controller 114 can place the motor 50 in its standby mode to allow the prime mover 14 alone to drive the pump 42, such as by deactivating the inverter 102 for example by opening all power switches Q1-Q6. The controller 114 can determine pump speed as a function of time and its determination of its rotor position by way of the back EMF signals. Also, the controller can determine pump speed as a function of prime mover speed signals received a prime mover speed sensor such as the input device 124.

It is desirable to ensure a smooth transition between driving the pump by the prime mover 14 and by the electric motor 50. Accordingly, the drive system controller 114 needs to know the rotational speed and position of the rotor of the electric motor 50 even when the inverter 102 is inactive or in standby mode. When the drive system controller 114 detects that the pump and/or motor speed has dropped below a pre-defined threshold, the controller 114 immediately exits standby mode and provides power to the motor 50 to drive the pump 42 at or above the threshold speed. Otherwise, the transmission may lose fluid pressure and transmission gear engagement might be lost. Because the controller 114 knows the position of the motor rotor 56 at any given time via the back EMF signals, the inverter 102 and motor 50 can be instantly activated so that pump speed does not drop below the threshold speed.

Operation of the electric motor 50 from standby mode is different from initial start-up of the electric motor 50 from standstill. When the electric motor 50 is started from standstill, the drive system controller 114 does not initially know the rotor position and, thus, suitable open loop ramp up control is used to rotate the motor rotor beyond a certain minimum speed above which the drive system controller 114 can begin to reliably detect back EMF zero crossings. This start-up process typically takes several hundred milliseconds.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. By way of example without limitation, while the electric motor has been shown as being adapted for a transmission pump, it could be adapted for any other suitable device(s) of any kind. The invention is defined by the following claims.

What is claimed is:

1. A drive system for a brushless direct current motor having a plurality of phase windings adapted to be energized by synchronized application of drive voltages, the drive system comprising:
    a plurality of phases adapted to be coupled to the plurality of phase windings of the motor;
    an inverter circuit coupled to the plurality of phases and adapted to apply the drive voltages during an inverter active mode:
    at least one resistor connected to ground, and to at least one of the plurality of phases between the phase windings and the inverter circuit; and
    a controller adapted to determine back electromotive force voltages during an inverter inactive mode for estimating at least one of motor position or speed.

2. The system of claim 1, wherein the at least one resistor includes a plurality of resistors connected to ground and to the plurality of phases.

3. The system of claim 2, further comprising:
    voltage scaling circuitry connected to the plurality of phases between the plurality of resistors and the inverter circuit.

4. The system of claim 3, further comprising:
    clamping circuitry coupled to the voltage scaling circuitry;
    a selector coupled to the clamping circuitry;
    a controller coupled to the selector through at least one isolation device; and
    a gate driver coupled to the controller and to the inverter circuit.

5. The system of claim 4, further comprising at least one of a prime mover speed sensor or a transmission input shaft speed sensor coupled to the controller.

6. A method of controlling a brushless direct current motor having a plurality of phase windings adapted to be energized by an inverter circuit that synchronously applies drive voltages through a plurality of phases to produce drive currents in the phase windings, the plurality of phase windings being connected through a plurality of resistors to ground between the motor and the inverter circuit, the method comprising:
    determining at least one of rotor position or a speed or detection back electromotive force voltages when the inverter circuit is inactive.

7. A method of driving a transmission pump directly by an electric motor through a pump input torque member or indirectly by a prime mover through an overrunning clutch coupled to the pump input torque member, comprising the steps of:
    determining pump speed;
    activating an inverter coupled to the electric motor to drive the pump when the pump speed is less than a threshold speed; and
    deactivating the inverter to allow the prime mover to drive the pump when the pump speed is greater than the threshold speed.

8. The method of claim 7, wherein the step of determining prime mover speed is enabled by a prime mover speed sensor.

9. The method of claim 7, wherein the step of determining pump speed is enabled by estimating speed of the electric motor by detecting back EMF zero-crossings even when the inverter is inactive.

10. The method of claim 9, wherein the back EMF zero-crossing detection is facilitated by ground referencing phases connected to the electric motor through a bank of resistors.

* * * * *